Aug. 11, 1936.   D. H. STOUGHTON   2,050,817
THRUST BEARING
Filed Aug. 22, 1935
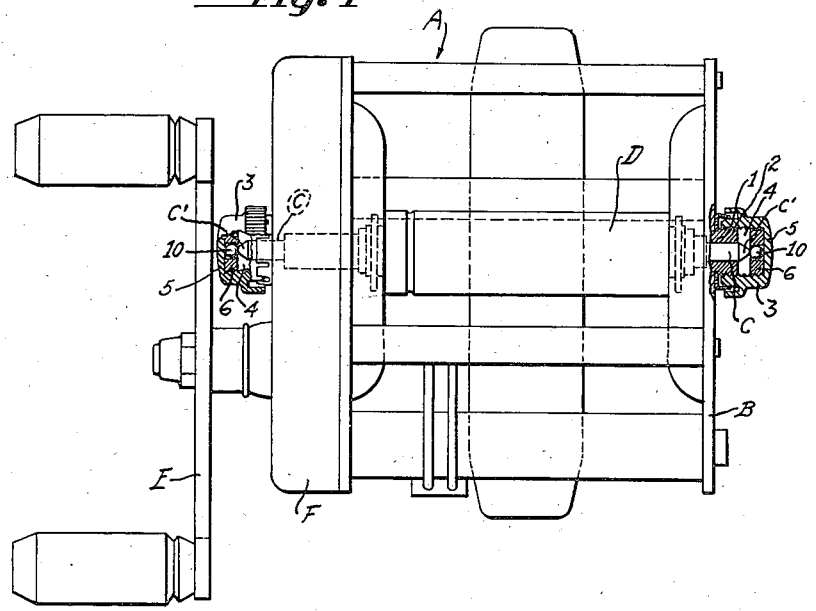
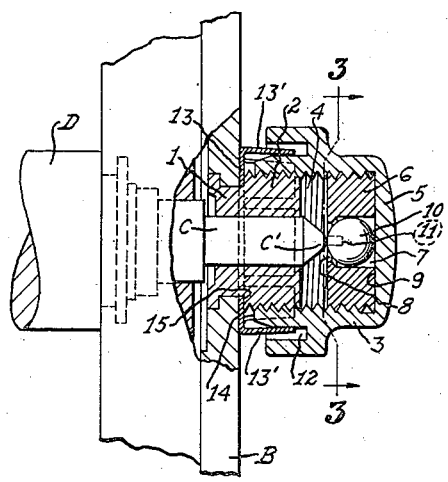
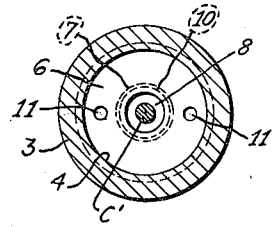
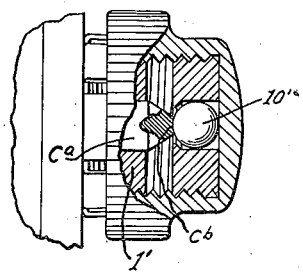
INVENTOR
DILLIS H. STOUGHTON
ATTORNEY Patented Aug. 11, 1936

2,050,817

UNITED STATES PATENT OFFICE 2,050,817

THRUST BEARING

Dillis H. Stoughton, University City, Mo., assignor to Shapleigh Hardware Company, St. Louis, Mo., a corporation of Missouri Application August 22, 1935, Serial No. 37,309

1 Claim. (Cl. 308—135)

This invention relates generally to thrust bearings adapted for use at ends of shafts and other rotatable elements, the predominant object of the invention being to provide an improved and simplified thrust bearing which performs its intended function in a highly efficient manner.

Fig. 1 is a plan view of a fishing reel having a pair of the improved thrust bearings associated therewith.

Fig. 2 is a fragmentary, enlarged view, partly in elevation and partly in section, showing the improved thrust bearing in association with parts of a fishing reel.

Fig. 3 is a section taken on line 3—3 of Fig. 2.

Fig. 4 illustrates a modified form of the invention.

In the drawing, wherein are shown for the purpose of illustration, merely, two embodiments of the invention, A designates a fishing reel of common construction, said fishing reel including the usual frame B which supports a rotatable shaft C on which is fixedly mounted a member D on which a fishing line is wound and unwound during operation of the reel. Rotary motion is imparted to the shaft C and the member D of the fishing reel A through the instrumentality of a handle E, such rotary motion being transmitted from the handle E to the shaft C through suitable gearing (not shown), which is enclosed within the housing portion F of the reel A.

At its ends the shaft C of the fishing reel A is supported by bearing members 1 which are supported by the frame of the reel, said bearing members including each an externally screw-threaded portion 2 which extends outwardly from the frame of the reel. Mounted on the extended portion 2 of each bearing member 1 is a cap 3 which is provided with a screw-threaded opening 4 formed therein, the threads of which engage the external screw-threads of the associated bearing member. The opening 4 is open at the inner end of the cap and is closed at the outer end of the cap by an end wall 5. Located within the screw-threaded opening 4 formed in the cap 3 is an externally screw-threaded plug 6 which is provided with a centrally located opening 7 formed therethrough, said opening 7 being of reduced diameter at one end as designated by the reference character 8 in Fig. 2.

The face 9 of the plug 6, which is opposite to the face thereof at which the reduced end portion of the opening 7 is located, is arranged in contact with the inner face of the wall 5 of the cap 3, and an anti-friction ball 10 is confined within the opening 7 of the plug between the reduced end portions thereof and the end wall 5 of the cap 3. The plug 6 is provided with spaced apertures 11, as shown most clearly in Fig. 3, which are adapted to receive a spanner tool so that the plug may be rotated for introducing the plug into the opening 7 and for removing said plug from the opening. The balls 10 of the thrust bearing structures arranged at the opposite ends of the shaft C contact with the opposite ends of said shaft, the shaft C being provided with tapered portions C' at its opposite ends which contact with said balls.

The cap 3 of each thrust bearing structure is provided with an annular recess 12 which is open at one end of the cap as shown most clearly in Fig. 2, and resilient fingers 13' of a member 13 are extended into said recess and press against a wall thereof. The member 13 includes a base portion 14, from which the resilient fingers extend, said base portion having an opening formed therethrough through which a portion of the associated bearing member 1 extends, and said member 13 being held in place by having a portion thereof which surrounds the opening formed through the base portion of said member clamped between a shoulder 15 formed on the bearing member 1 and the adjacent face of the frame of the reel A. The pressure exerted against the wall of the annular recess 12 of the cap 3 by the resilient fingers 13' of the member 13 prevents unintended rotation of said cap.

In the use of the improved thrust bearings, the antifriction balls 10 are in rolling contact with the opposite ends of the shaft C, and as a result thereof end thrust of the shaft is prevented. Also, as wear is produced at the ends of the shaft because of long and continued contact with the balls 10, the caps 3 may be screwed inwardly with relation to the ends of the shaft so as to maintain close contact between the ends of the shaft and the balls, and thereby eliminate any play between said parts.

In Fig. 4 I illustrate a construction where the end of the shaft $C^a$ is provided with a cup-shaped depression $C^b$ which receives a portion of the associated anti-friction ball 10'. Thus the anti-friction ball serves to aline the shaft and wear on the bearing member 1' which supports the shaft is minimized.

While in this application the improved thrust bearing is illustrated and described in association with a fishing reel, it is to be understood that this was done merely for convenience in describing the invention, as the invention is not limited to such precise use. As a matter of fact, the improved thrust bearing is capable of use with a great variety of apparatus where thrust bearings are required.

I claim:

In combination with a shaft, a bearing member for supporting said shaft for rotary motion, said bearing member being provided with an externally screw-threaded portion, an internally screw-threaded cap mounted on the screw-threaded portion of said bearing member, a screw-threaded plug within said cap, an anti-friction element supported by and confined within said cap by said plug, said anti-friction element adapted to contact with an end of said shaft, said cap being adjustable on said screw-threaded portion of said bearing member so as to maintain said anti-friction element in close contact with the end of said shaft.

DILLIS H. STOUGHTON.